Sept. 29, 1936. D. B. HOWARD 2,055,494
MAP DISTANCE AND COURSE INDICATOR
Filed March 7, 1933 2 Sheets-Sheet 1

INVENTOR
DUDLEY B. HOWARD
BY
ATTORNEYS

Sept. 29, 1936. D. B. HOWARD 2,055,494
MAP DISTANCE AND COURSE INDICATOR
Filed March 7, 1933 2 Sheets-Sheet 2
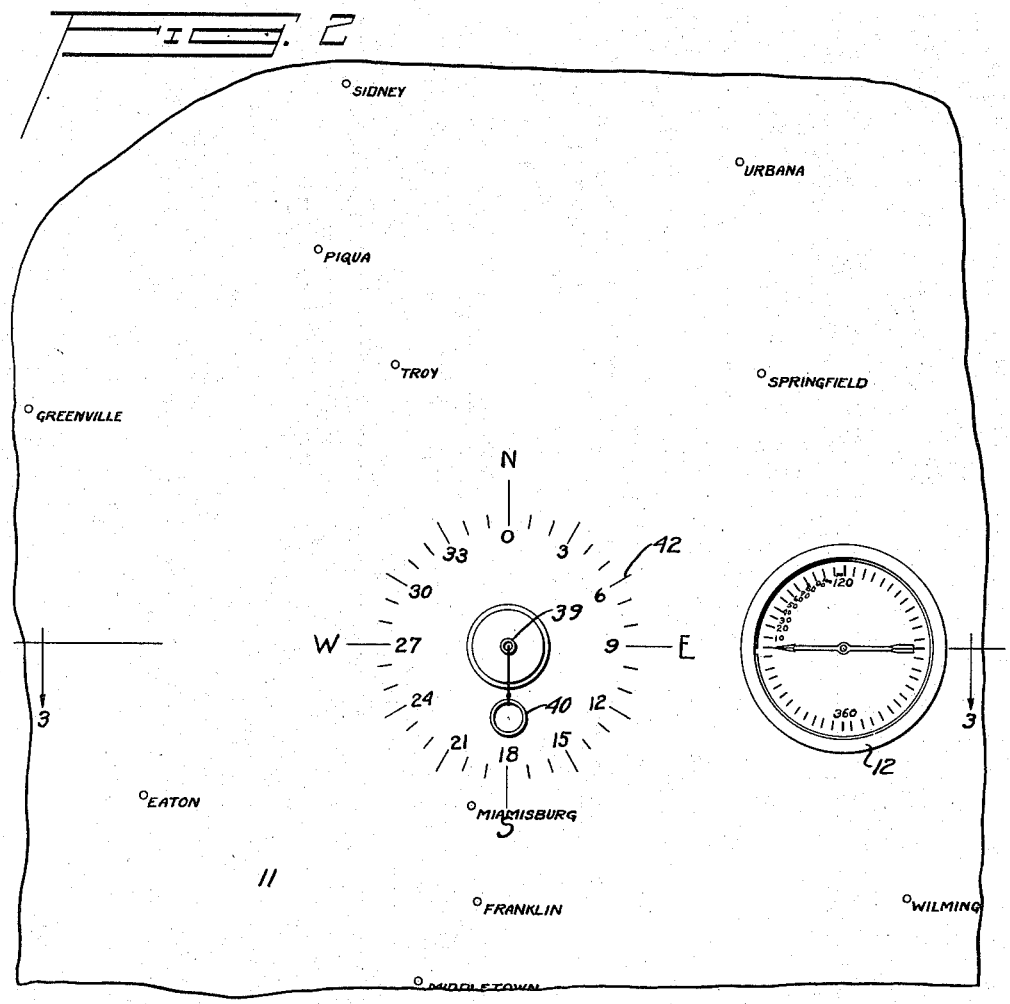
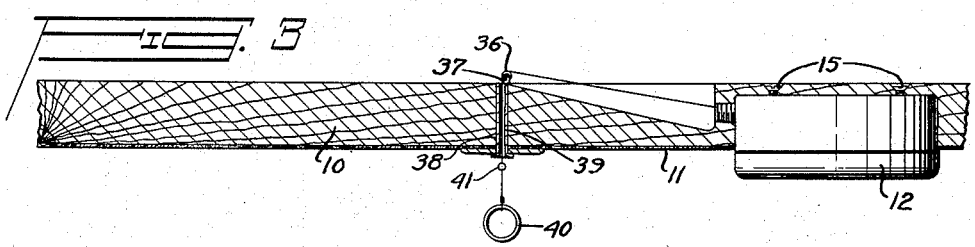
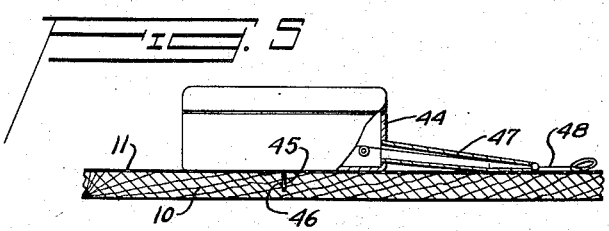
INVENTOR
DUDLEY B. HOWARD
BY
ATTORNEYS Patented Sept. 29, 1936

2,055,494

UNITED STATES PATENT OFFICE 2,055,494

MAP DISTANCE AND COURSE INDICATOR

Dudley B. Howard, Dayton, Ohio

Application March 7, 1933, Serial No. 659,956

13 Claims. (Cl. 33—1)

(Granted under the act of March 3, 1883, as amended April 30, 1928; 370 O. G. 757)

The invention described herein may be manufactured and used by or for the Government for governmental purposes, without the payment to me of any royalty thereon.

The invention relates to measuring instruments and in particular to a handy device for application to maps, globes, and the like, for facilitating in the measurement of distances between points on the surfaces thereof.

A primary object of the present invention is to provide an arrangement of a map and a map distance indicating apparatus whereby map distance between a point of reference and any other point on the map may be readily determined.

A further object of the present invention is to provide a map with a compass rose disposed about a predetermined point of reference thereon and a distance indicating apparatus cooperating with said map and compass rose so that for any measured distance the bearing between the point of reference and any of said distances is indicated.

A still further object of the present invention is to provide in combination a map having a compass rose disposed thereon at a predetermined point of reference and means including an extensible spanning element angularly movable over said map from said point of reference to a point or points distant therefrom to indicate the geographical bearing of said distant point with respect to said point of reference.

A further object of this invention is to provide a retractable spanning element which issues from a point of reference on the surface to be measured and which may be extended to any desired length in spanning the distances to be measured.

A still further object of this invention is to provide in a device of this character means distinct from the spanning element for indicating the linear measurement for such spanning operation.

Another object of this invention is to provide in a device of this character means associated with the spanning means for indicating the geographic bearing of the measured distance with respect to the point of reference.

A still further object of the present invention is to provide, as an article of manufacture, a measuring device provided with a part having a point of reference adapted for being readily positioned coincident with a point or points of reference on a measurable surface, said measuring device including a retractable spanning element of flexible material capable of spanning any two or more points on the measurable surface and having means for indicating in appropriate units of linear measurement the portion spanned by said spanning element on the measurable surface.

With these and other objects in view, the invention consists in novel arrangement and construction of the parts hereinabove set forth.

In the drawings:

Fig. 2 is an enlarged detail view of a portion of the embodiment shown in Fig. 1;

Fig. 3 is a sectional view taken on the line 3—3 of Fig. 2;

Fig. 5 is a side view of a measuring device capable of ready application to a map or other surface to be measured.

Figure 1:
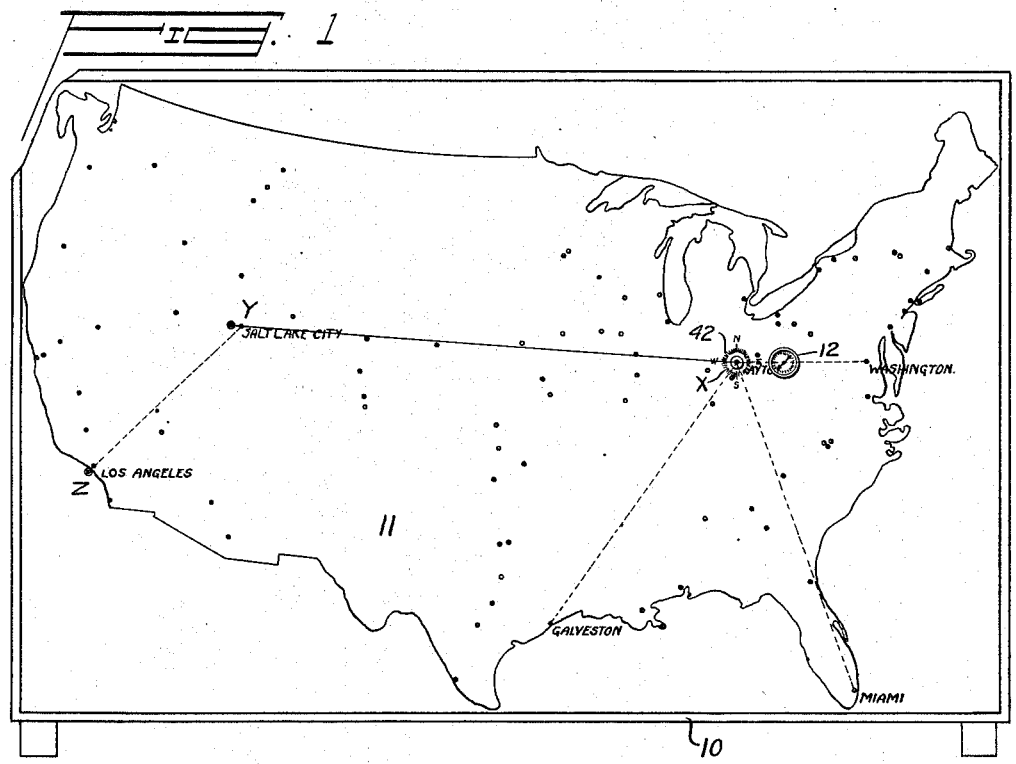
Fig. 1 is a plan view in miniature of one embodiment of my invention.

Referring more particularly to the drawings wherein corresponding parts are designated by like numerals throughout the several views, the apparatus in one embodiment of my invention herein illustrated comprises, as in Fig. 1, a support 10 adapted for carrying a measurable surface such as a map generally indicated by numeral 11, bearing geographical representations of cities and airport stations. An indicator, generally referred to by numeral 12, is carried by the support 10 having its dial face disposed substantially flush with the surface of the map as illustrated in Fig. 3 of the drawings.

Figure 4:
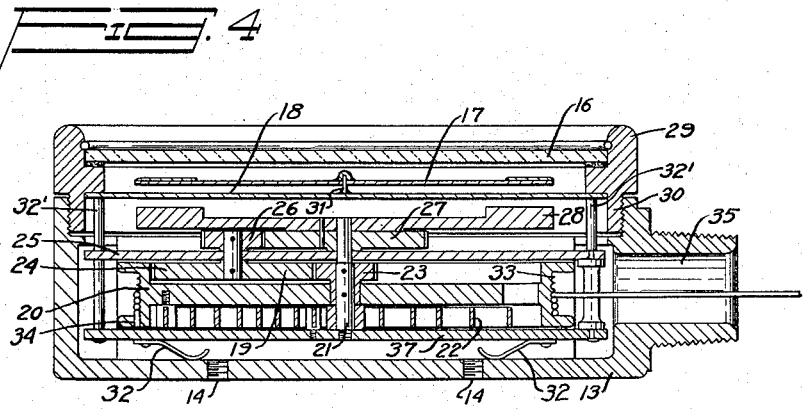
Fig. 4 is an enlarged sectional view of the indicating device.

As shown in cross-section in Fig. 4, this indicator comprises generally a casing 13 provided with threaded openings 14 adapted for receiving the screws 15 to securely hold the casing into the support 10. The casing 13 is also provided with the usual glass bezel 16 to house a pointer 17, dial 18 calibrated in map mileage or any other appropriate units of linear measurement, and a gear train operating mechanism therein, generally indicated by numeral 19.

The indicating mechanism 19, heretofore mentioned, comprises generally a drum 20 rotatably mounted upon a main center shaft 21 fixedly supported on a mounting bracket within the casing 13. A helically wound coil spring 22, having its inner end fixedly secured to the mounting bracket heretofore mentioned and having its outer end fixedly secured to the drum 20 adjacent its periphery, tends to maintain the drum 20 from rotating in one direction. A driving gear 23 centrally carried on and rotatable with the drum 20 meshes with an idler gear 24 pivotally mounted on the mounting bracket 25 carried by the casing 13. A secondary idler gear 26 rotated by the gear 24 meshes with a main gear 27, which pivots on the shaft 21 carried by the support 25 and centrally located with respect to the casing 13. This gear carries a magnet 28. The dial 18, heretofore mentioned, is supported on annular flange formed in the casing cover 29, as shown in Fig. 4. This cover is provided with a lower threaded portion 30 adapted to be adjustably screwed into a threaded portion provided in the upper open end of the casing 13. The dial 18 is provided with a centrally located shaft 31, upon which is freely rotatable the pointer 17. From the description thus far it will be apparent that as the drum 20 is rotated the magnet 28 will be rotated by movement of the gear train heretofore mentioned and the pointer 17 in following the movement of the magnet 28 will move over the dial 18. By screwing the cover in or out with respect to the casing 13 it will be apparent that the zero indication of the scale of the dial can be moved into coincidence with the pointer 17.

The periphery of the drum 20, as will be noted by referring to Fig. 4, is formed with a series of semicircular grooves 33 upon which is adapted to be wound in coil form a flexible cable of woven material, hereinafter referred to as a spanning element, the inner end of which is adapted to extend through an opening 34 formed in the side of the drum adjacent its periphery and secured in any suitable manner thereto. The other end of the cable is adapted to be threaded through an opening 35 formed in the side of the casing 13 and passed over a pulley 36 pivotally mounted on a bracket member 37, which is secured to the rear end of the support 10, as shown in Fig. 3. It will be noted by referring to Fig. 4 that the mounting bracket 25 has secured thereto at its lower end a plurality of spring clips 32 bearing against the casing 13 which are adapted to normally urge a pair of pins 32' carried by the bracket 25 against the dial 18 to maintain the same in contact with the annular flange heretofore mentioned.

As will be noted by referring to Fig. 2, the support 10 and map 11 are formed with an aperture 38, within which is adapted to be secured a guide member 39, formed with a circular opening through which the end of the spanning element is threaded. This guide member, as will be noted by referring to Figs. 1 and 2, is positioned on the map at the base location or point of reference hereinabove mentioned. The end of the spanning element has secured at its free end a ring 40 to permit its being readily grasped in the fingers, an index 41 being provided adjacent the ring, the purpose of which will be hereinafter set forth.

As shown in Figs. 1 and 2, a compass rose 42 is provided on the map, the axis of which is substantially coincident with the reference point hereinabove mentioned. This card may either be printed on the map in the manner described or the same results can be accomplished by providing a card which may be readily attachable to the map in the position and manner described above.

Fig. 5 shows a modification of an indicator device which may be manufactured and sold as a separate article and which is capable of application to a surface to be measured. This device includes a casing 44 provided with pin 45 which is adapted for insertion in openings 46 disposed on the surface to be measured at any predetermined points. This casing is provided at its one side with a funnel-shaped portion 47 forming an index through which is adapted to be threaded a spanning element 48 of flexible material. Either the pin 45 or edge of the funnel-shaped portion 47 may be used as an index at the option of the operator. The spanning element 48 is similar to that heretofore described, being connected at its inner end to an indicating mechanism of the type set forth in connection with Fig. 4 of the drawings and a description of the former should suffice for both.

The operation of the device is as follows:

When it is desired to ascertain the distance from the reference point to a point distant therefrom, as for instance the map distance from the point X to the point Y, this same can be accomplished by manually grasping the ring in the fingers and moving the index on the spanning element over the map until the index is positioned coincident with the point it is desired to measure, herein referred to as point Y. In so doing the drum 20 will be rotated and the gear train will operate to effect a movement of the pointer 17 over its scale and give a visible indication of the map mileage between points X and Y. It is to be understood that the ratio of the gear train is such as to effect a movement of the pointer over its scale, which is proportional to the spanning portion of the spanning element between the point of reference X and point to be measured Y. If it is desired to ascertain the map distance between point Y and point Z, this same can be accomplished by holding a pin at the point Y or other suitable means, and thereafter moving the index on the spanning member to the point Z, as illustrated in Fig. 1.

It will also be apparent that the spanning member in moving angularly over the compass rose will indicate directly the geographical bearing of the point Y with respect to the point X.

The invention herein disclosed may find expression in various forms and it is to be understood that the basic principle herein involved consists in the use of a flexible spanning element which may be drawn taut to span the distance between any two or more points, together with an indicator for giving a readily visible indication of the distance spanned by the spanning member.

I claim:

1. In a device of the character described, a map having an aperture at a predetermined point of reference, a retractable spanning element threaded through the map aperture adapted for being extended taut over said map from said point of reference to a point distant therefrom, and separate means controlled by movement of said spanning element for indicating in appropriate units of linear measurement the map mileage between said reference point and said distant point.

2. In a device of the character described, a map having an aperture at a predetermined point of reference, a retractable spanning element threaded through the map aperture adapted for being extended taut over said map from said point of reference to a point distant therefrom, and separate means operated by movement of said spanning element for indicating in appropriate units of linear measurement the map mileage between said reference point and said distant point.

3. In a device of the character described, a map having an aperture at a predetermined point of reference, a retractable spanning element threaded through the map aperture adapted for being extended taut over said map from said point of reference to a point distant therefrom, means operated by movement of said spanning element for indicating in appropriate units of linear measurement the map mileage between said reference point and said distant point, said indicating means comprising a pointer, a scale over which said pointer operates, a motion reducing mechanism for moving said pointer and a drum operatively connected to said mechanism upon which said spanning element is wound when in a retracted position.

4. In a device of the character described, a map having an aperture at a predetermined point of reference, a retractable spanning element of flexible material threaded through the map aperture adapted for being extended taut over said map from said point of reference to a point distant therefrom, means operated by movement of said spanning element for indicating in appropriate units of linear measurement the map mileage between said reference point and said distant point, said indicating means comprising a pointer, a scale over which said pointer operates, a motion reducing mechanism for moving said pointer, and a spring controlled drum operatively connected to said mechanism upon which the inner end portion of said spanning element is automatically wound into a retracted position.

5. In a device of the character described, a map having an aperture at a predetermined point of reference, a retractable spanning element of flexible material threaded through the map aperture adapted for being extended taut over said map from said point of reference to a point distant therefrom, means operated by movement of said spanning element for indicating in appropriate units of linear measurement the map mileage between said reference point and said distant point, said indicating means comprising a pointer, a scale over which said pointer operates, a motion reducing mechanism for moving said pointer, a spring controlled drum connected to said mechanism upon which the inner end of said spanning element is anchored and automatically wound into a retracted position, and a stop provided on the free end of said spanning element to limit the retraction of said element.

6. In a device of the character described, a map having an aperture at a predetermined point of reference, a retractable spanning element of flexible material threaded through the map aperture adapted for being extended taut over said map from said point of reference to a point distant therefrom, means operated by movement of said spanning element for indicating in appropriate units of linear measurement the map mileage between said reference point and said distant point, said indicating means comprising a pointer, a scale over which said pointer operates, a motion reducing mechanism for moving said pointer, a spring controlled drum connected to said mechanism upon which the inner end of said spanning element is anchored and automatically wound into a retracted position, a stop provided on the free end of said spanning element to limit the retraction of said element, and a bead fixed adjacent to said stop forming an index adapted for registering with said distant point.

7. In a device of the character described, a member having a surface to be measured relative to a point of reference, a spanning element movable relative to said point of reference and adapted for being variably extended over said surface, measuring means fixedly mounted on said member including a scale and pointer associated with said spanning element for indicating in appropriate units of linear measurement the portion of said element extending over said surface, and means for effecting a relative adjustment between said scale and pointer to obtain a zero indication of said pointer over said scale for any spanning portion of said element extending over said surface relative to said point of reference.

8. In a device of the character described, a member having a surface to be measured, a guide member fixedly secured to said first-mentioned member forming a point of reference on said surface, a spanning element threaded through said guide member and adapted for being variably extended over said surface to be measured, measuring means including a scale and pointer associated with said spanning element for indicating in appropriate units of linear measurement the portion of said element extending over said surface, and means for effecting a relative adjustment between said scale and pointer to obtain a zero indication of said pointer over said scale for any spanning portion of said element extending over said surface relative to said point of reference.

9. In a device of the character described, a member having a surface to be measured relative to a point of reference, a retractable spanning element movable relative to said point of reference and adapted for being extended taut over said surface from said point of reference to one or more points distant therefrom, measuring means fixedly mounted on said member including a scale and pointer associated with said spanning element for indicating in appropriate units of linear measurement a portion of said element extending over said surface, and means for effecting a relative adjustment between said scale and pointer to effect a zero indication of said pointer over said scale and obtain successive measurements of the distance between one of said distant points and said point of reference and any other distant point respectively.

10. In a device of the character described, a member having a surface to be measured relative to the point of reference, a spanning element movable relative to said point of reference and adapted for being variably extended over said surface, a measuring means fixedly mounted on said member including a scale and pointer associated with said spanning element for indicating the appropriate units of linear measurement, a portion of said element extending over said surface, a means for effecting a relative adjustment between said scale and pointer to obtain a zero indication of said pointer over said scale for any spanning portion of said element extending over said surface relative to said point of reference, and a compass rose disposed in predetermined relationship with respect to said point of reference and cooperating with said spanning element to indicate the geographic bearing of said element with respect to the cardinal points on said compass rose.

11. In a device of the character described, a member having a surface to be measured, a point of reference forming a base location disposed in predetermined relationship on said member, a spanning element movable relative to said point of reference adapted for being variably extended over said surface, a measuring means fixedly mounted on said member including a scale and pointer associated with said spanning element for indicating in appropriate units of linear measurement a portion of said element extending over said surface, means for adjusting said scale to obtain a zero indication of said pointer over said scale for any spanning portion of said element extending over said surface relative to said point of reference, and a compass rose concentrically disposed about said point of reference on said member and cooperating with said spanning element to indicate the geographic bearing of said spanning element with respect to the cardinal points on said compass rose.

12. In a device of the character described, a member having a surface to be measured, a guide member fixedly mounted on said member forming a fixed point of reference on said surface to be measured, a compass rose centering on said guide member, a retractable spanning element of flexible material threaded through said guide member and adapted for being variably extended over said surface and overlie said compass rose to indicate directly the geographic bearing of said spanning element with respect to the cardinal points on said compass rose, measuring means including a scale and pointer operated by extension of said spanning element over said surface for simultaneously indicating in appropriate units of linear measurement the portion of said spanning element extending over said surface, and means for adjusting said scale to obtain a zero indication of said pointer on said scale for any spanning portion of said element extending over said surface relative to said point of reference.

13. In a device of the character described, a member having a surface to be measured relative to a fixed point of reference thereon, said surface being provided with a compass rose, the center of which constitutes the said fixed point of reference, a spanning element mounted on said member for swivelling movement about an axis coincident with the center of said compass rose and being variably extensible over said surface from and about the said point of reference, means fixedly mounted on said member and connected to said spanning element for measuring and indicating the values of extension of said element over said surface, and means for resetting said measuring means to any desired reading.

DUDLEY B. HOWARD.